United States Patent [19]
Conroy et al.

[11] 3,763,534
[45] Oct. 9, 1973

[54] FABRICATION PROCESS FOR POROUS METAL BEARINGS

[75] Inventors: Thomas Francis Conroy, Latham; Carl Gustave Ringwall, Scotia, both of N.Y.

[73] Assignee: General Electric Company, New York, N.Y.

[22] Filed: May 30, 1972

[21] Appl. No.: 258,034

[52] U.S. Cl. 29/148.4 B, 29/149.5 A, 29/149.5 PM, 308/9
[51] Int. Cl. ........................ B23p 11/00, B21d 53/10
[58] Field of Search ............... 29/148.4 B, 149.5 A, 29/149.5 PM, 420.5; 308/9, 188

[56] References Cited
UNITED STATES PATENTS

| | | |
|---|---|---|
| 3,169,807 | 2/1965 | Abel et al. ........................... 308/9 |
| 3,274,666 | 9/1966 | Nordsieck ..................... 29/148.4 B |
| 3,491,423 | 1/1970 | Haller ............................. 308/188 X |

*Primary Examiner*—Thomas H. Eager
*Attorney*—Arthur E. Fournier, Jr. et al.

[57] ABSTRACT

A process for fabricating porous metal bearings comprising the steps of rough forming from blanks of porous material a pair of bearing sections with surfaces each having a substantially semi-bearing configuration, performing by mechanical means a precision machining operation on these surfaces, then chemically machining the bearing surfaces to uniformly remove a relatively small thickness of metal from all exterior portions thereof to restore the porosity of the outside bearing surfaces, and thereafter joining the bearing sections together to form a finished bearing of unitary construction.

12 Claims, 5 Drawing Figures

PATENTED OCT 9 1973 3,763,534

FABRICATION PROCESS FOR POROUS METAL BEARINGS

BACKGROUND OF THE INVENTION

1. Field of the Invention

This invention relates to metal bearings, and more specifically to a process for fabricating porous metal bearings.

2. Description Of The Prior Art

It has been known heretofore in the prior art to provide porous metal bearings. Further the conventional approach employed for fabricating such porous bearings has been by pressing powdered metal and then sintering the resulting pressed metal to form a one piece structure. This is thereafter followed by a mechanical machining operation performed on the outside surfaces of the structure thereby to provide these surfaces with the required degree of finish. However, a prime disadvantage of this approach is that any mechanical machining performed on the surface of the structure after forming can drastically alter the porosity of the material. That is, it has been found that conventional metal removal techniques performed on the material closes or restricts the surface pores thereof thus reducing the area through which fluid flow may occur.

Another disadvantage of the aforedescribed prior art approach for fabricating porous bearings resides in the fact that conventional powdered metal pressing and sintering techniques are difficult to practice. This is particularly so in the case of the fabrication of porous bearings having relatively precision spherical surfaces. For example, in the case of porous bearings intended for use as the bearing surface for the rotor of a two degree-of-freedom gyro, it is necessary in order to minimize drift of the gyro that the bearing possess a spherical surface typically of ± 0.0005 inches sphericity. To fabricate such a bearing utilizing known pressing and sintering techniques would require the employment of a removable core of some form. In addition, precision forming techniques would be required to achieve the required spherical tolerances. Thus, even where the aforedescribed approach permits the fabrication of a porous bearing with spherical surfaces having the desired tolerances, the cost of manufacture thereof including, for example, the cost of the manufacturing equipment necessary for carrying out the fabrication process as well as the cost of the skilled labor needed to practice the process has heretofore served to severely limit the use of porous bearings in applications requiring bearings having a high degree of sphericity as for instance in the case of the aforementioned two degree-of-freedom gyro.

OBJECTS OF THE INVENTION

It is therefore an object of the present invention to provide a novel and improved process for fabricating porous metal bearings which bearings after fabrication retain substantially the original porosity of the material from which the bearings are fabricated.

It is another object of the present invention to provide such a process whereby porous metal bearings having surfaces possessing extremely close tolerances are capable of being fabricated.

A further object of the present invention is to provide such a process for fabricating porous metal bearing which are particularly adapted for utilization in two degree-of-freedom gyros.

A still further object of the present invention is to provide such a process for fabricating porous metal bearings which is characterized by its relatively low cost of operation, the ease with which it may be carried out, and its adaptability for high production manufacting of uniformly reproducible bearings.

SUMMARY OF THE INVENTION

In carrying out the invention in one form, a process is provided for fabricating spherical porous metal bearings particularly adapted for employment in two degree-of-freedom gyros. The initial step in the process comprises rough forming from blanks of materials which is porous throughout its cross-section a pair of hemispherical sections each having surfaces comprising a substantially semi-bearing configuration. A precision machining operation with mechanical means is then performed on the exterior surface portions which are intended to serve as bearing surfaces in order to provide such surfaces with the required degree of accuracy. This is followed by a chemical machining of the bearing sections to uniformly remove a relatively small thickness of metal from the exposed exterior surface portions thereof thereby to remove any metal clogging surface pores and thus restore the porosity of the outside portions of the surfaces. Thereafter this pair of hemispherical sections are bonded with minimal pore clogging effects to form a finished spherical substantially uniformly porous bearing.

The invention will be more fully understood from the following detailed description and its scope will be pointed out in the appended claims.

DESCRIPTION OF A PREFERRED EMBODIMENT

Figure 1:
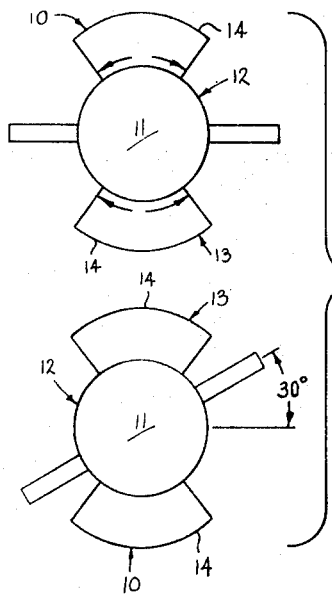
FIG. 1 is a schematic representation of a two degree-of-freedom gyro embodying a porous gas bearing of a type advantageously fabricatable in accordance with the process of the present invention.

Referring now to FIG. 1 of the drawing, there is illustrated therein a schematic representation of a two degree-of-freedom gyro, generally designated by reference numeral 10, and embodying a porous metal air bearing 11 having an external spherical bearing surface and fabricated in accordance with the process of the present invention. The gyro 10, per se, which is depicted in both a 0° attitude angle and a 30° attitude angle in FIG. 1 of the drawing, forms the subject matter of another patent application, Ser. No. 258,115, filed May 30, 1972 in the name of Carl G. Ringwall, and assigned to the same assignee as the present invention. As such, the gyro 10 will be only briefly described hereinafter, it being understood that for a fuller description thereof reference may be had to the aforereferenced concurrently filed patent application.

Figure 2:
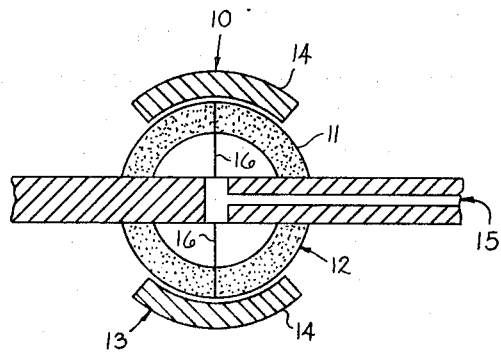
FIG. 2 is a schematic cross-section view of the gyro of FIG. 1 illustrating the porous gas bearing thereof fabricated in accordance with the process of the present invention and having an external bearing surface.

As depicted in FIGS. 1 and 2 of the drawing, the basic element of gyro 10 is a rotor/spherical bearing assembly 12. In actual use however such as in a flight control system, the gyro 10 is to be found employed in association with a plurality of signal pickoff nozzles (not shown) having appropriate amplification circuitry (not shown) connected thereto. For an example of one such flight control system in which a gyro 10 is utilized, reference may be had to U.S. Pat. application, Ser. No. 257,661, filed May 30, 1972 in the name of Carl G. Ringwall, and assigned to the same assignee as the present invention. As described and illustrated in the latter patent application, a pair of pickoff nozzles are positioned in juxtaposed relation to the path of rotation of the assembly 12. The nozzles function to generate a differential signal which is received and amplified by the amplification circuitry connected to the nozzles. The signal is generated by virtue of the fact that rotor means 13 of assembly 12, as shown in FIGS. 1 and 2 of the present application, comprises a segment 14 of a sphere. Thus, as the segment 14 rotates under a pickoff nozzle the gap between the surface of the assembly 12 and the nozzle will alternately change from a large gap to a small gap.. A large gap produces a low level, i.e., OFF, signal while a small gap produces a high level, i.e., ON, signal. Accordingly, in the aforedescribed manner an analog signal is provided which when filtered is proportional to the attitude of gyro 10.

In currently available two degree-of-freedom gyros, the useful angular operating range is generally limited by case erection torques induced by bearing flow which causes the spin axis of the gyro to become misaligned with the axis of the bearing pads, or by limitations on readout linearity. However, it has been found that porous spherical bearings fabricated in accordance with the process of the present invention produce no such changes in torque on the rotor, no matter how far it is swung off null. This is the result of preserving symmetry of bearing flow and support forces at all deflection angles which in turn stems from the fact that in such bearings the air flow to the bearing gap, which exists between the surfaces of the bearing 11 located in juxtaposed relation to the rotor means 13, is through the porous walls of the spherical bearing 11. In the case for example of the gyro 10 of FIGS. 1 and 2 of the drawing, the lubricant, or bearing suspending fluid, flow is fed from a suitable fluid supply source (not shown) to conduit means 15 and therethrough to the interior of bearing 11 from whence the fluid is supplied through the porous walls of the bearing 11 to the bearing gap. Thus, the flow distribution in the bearing gap and also the shear forces due to rotation are independent of the angular displacement of the rotor spin axis relative to the bearing axis. As such, if the porosity of the bearing is uniform, then the gas flow through the bearing surface is uniform and erection torques from both sources are eliminated. In addition, the physical constraints on angular displacement occasioned by the uncovering of feed orifices by the lips of the rotor, which are found to be present in the case of conventional bearings wherein fixed feed orifices are used to supply the bearings flow, are removed. A further advantage of porous spherical bearings is that the operating gap capable of being employed therewith may be made relatively large, i.e., in the order of 0.002 inches, whereby to make the flow coefficient of the bearing very nearly unity. Thereby, the flow to the gap is controlled by wall porosity and is independent of bearing gap. An additional advantageous result stemming therefrom is that manufacturing of the gyro is therefore simplified which in turn reduces the cost of manufacture thereof.

By contrast, conventional gyro designs which use fixed feed orifices to supply the bearing flow suffer from additional disadvantages. Thus, for example, only one configuration can be selected which will virtually eliminate either case erection torques due to bearing flow or torques due to rotational shear flows. However, both sources cannot be simultaneously eliminated with any one configuration. The resultant configuration is therefore necessarily a compromise design trading off the two error producing torque sources so as to minimize overall gyro drift.

As noted earlier, the application of porous material for hydrostatic gas or air bearings in journal bearing configuration has been known heretofore. However, the fabrication of such bearings has been relatively difficult and expensive. Also the resulting bearings have suffered from certain disadvantages. One such disadvantage stems from the fact that the machining operation performed on the bearing, after it has been pressed and sintered, to provide the bearing with the desired degree of finish and dimentional configuration, has had the adverse effect of decreasing the pore size in closing some of the pores in the exterior surface of the bearing. The undesirable effect thereof is of course that the flow is decreased in these closed and semi-closed pores thereby reducing the total area through which fluid flows may occur and more importantly the desired uniform distribution of fluid flow through the bearing walls. In addition, it has not been feasible here-to-date, because of the cost and difficulty of utilizing the techniques required, to fabricate porous bearings possessing surfaces having very small tolerances, i.e., in the order of ±0.0005 inches sphericity.

The fabrication process in accord with the present invention however now makes available a process for fabricating porous bearings wherein the bearings fabricated thereby do not suffer from the aforementioned disadvantages which have heretofore characterized porous bearings fabricated by means of prior art processes. More specifically, the process in accord with the present invention permits the fabrication of porous metal bearings wherein the bearings after fabrication retain substantially the original porosity of the material from which the bearings are fabricated. In addition, the process as set forth hereinafter permits such porous metal bearings to be fabricated with uniform reproducibility and with relative ease at relatively low cost, and in mass production lots.

Turning now to a description of the fabrication process of the present invention, in accord therewith preferably two halves or hemispherical sections of the spherical shell are first rough formed from blanks of metal which are porous throughout the cross-sections of the walls thereof. This may be accomplished utilizing known techniqes on a lathe for example or if high production is desired by pressing and sintering. In either case the equatorial parting line plane 16 is as shown in FIG. 2 of the drawing. The sphere halves are then bonded together or joined at the line 16. In accord with one embodiment of the invention, electron beam welding is preferably employed for this bonding operation. This preference in the bonding step is based primarily on the fact that although electron beam welding does destroy the porosity of the material at the joint, the area affected thereby can be readily confined and the affected area represents only a small and insignificant portion of the total area. To provide the bearing with the desired dimensions and degree of exterior finish, a final precision machining of the outside spherical bearing surfaces of the joined bearing sections is carried out. Here also conventional mechanical techniques may be employed to perform this operation. That is, the machining may be performed on a lathe or by grinding or by lapping. It is important to note here however that in performing this machining operation a material allowance must be provided for to allow for the final or finishing machining operation yet to be described. In this connection, a material allowance in the order of 0.001 inches will suffice. The final step in the fabrication process is a chemical machining of the bearing to remove a relatively small thickness of metal from all exposed surfaces thereof. This chemical machining step removes a thin layer of material from the previously mechanically machined surfaces to restore the porosity of the bearing surfaces to essentially the original value prossessed by the porous material from which the bearing is fabricated. More particularly, this chemical machining operation functions to open the pores in the bearing surfaces which may have been closed or restricted as a result of the aforedescribed final precision machining operation performed on the bearings. Chemical etchants such as those used in the photo-etching industry as for example ferric chloride can be used for the chemical machining operation.

Figure 5:
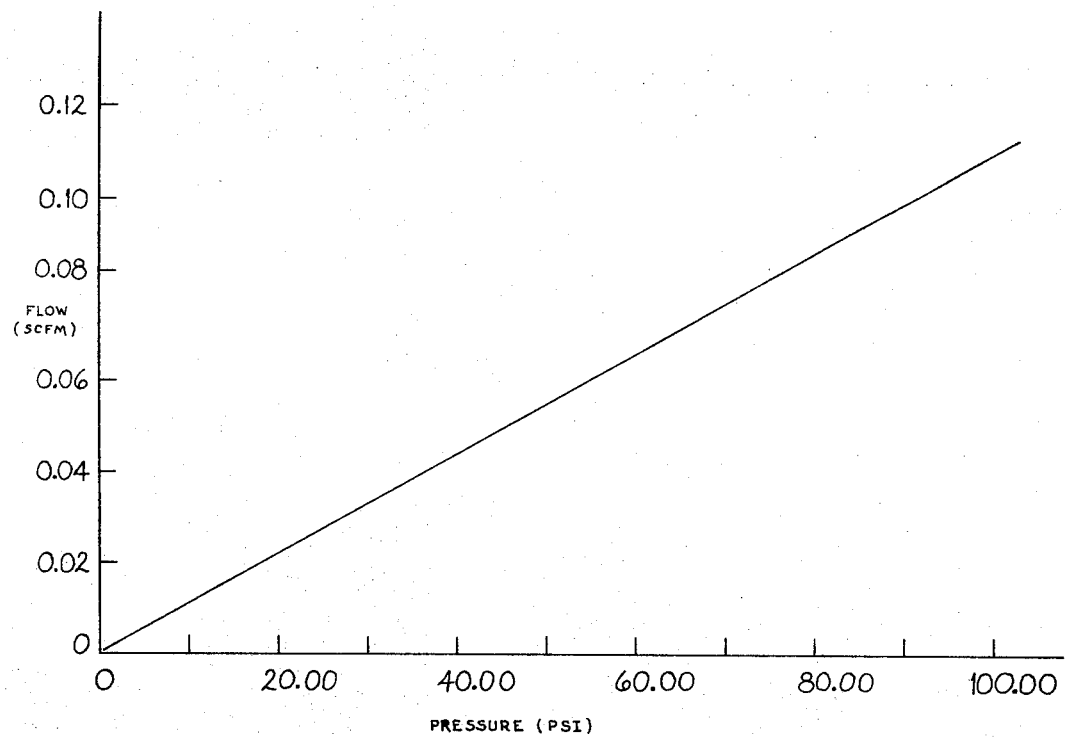
FIG. 5 is a graphical representation of the air pressure flow characteristics of a porous material which has undergone the machining steps of the process in accordance with the present invention.

In FIG. 5 of the drawing there is illustrated a pressure flow curve taken on a flat sample plate of porous material of the type from which porous metal air bearings are adapted to be fabricated in accordance with the process of the present invention. The specific porous material from which the sample was taken is type 316 sintered stainless steel. Although most of the background fabrication technology is confined primarily to phosphor bronze materials, the phosphor bronze materials are not considered suitable for the fabrication of porous bearings because of the inherent non-uniformity of porosity of the material. In contradistinction thereto however, the high density, i.e., 70 percent to 85 percent, sintered stainless steels have excellent uniformity. Permeability can be held to better than ± 3 percent on production lot quantities. It is therefore the logical choice for the spherical pad material.

With further reference to FIG. 5, the sample plate which was tested to produce the pressure flow curve depicted therein was machined and subjected to repeated etching cycles using ferric chloride as the photo-etchant with air flow measurements made at the completion of each cycle. As a result of these tests, it was found that the sample retained its original permeability after one 5-minute etch cycle. Subsequent etchings had no measurable effect on air flow. Further it will be noted from the graph of FIG. 5 that the flow characteristics are in the range required to support a gyro rotor. It was also determined however based on the test results depicted in FIG. 5 of the drawing that a less dense material in the order of 70 percent versus the 85 percent on which tests where run would be better suited to fabricate porous spherical bearings therefrom. For the less dense material would permit operation of the bearing at supply pressures of 100 psi and below. Further, no difficulties in machining or restoring the surface permeability is forseen resulting from the use of such lower density stainless steels.

Figure 3:
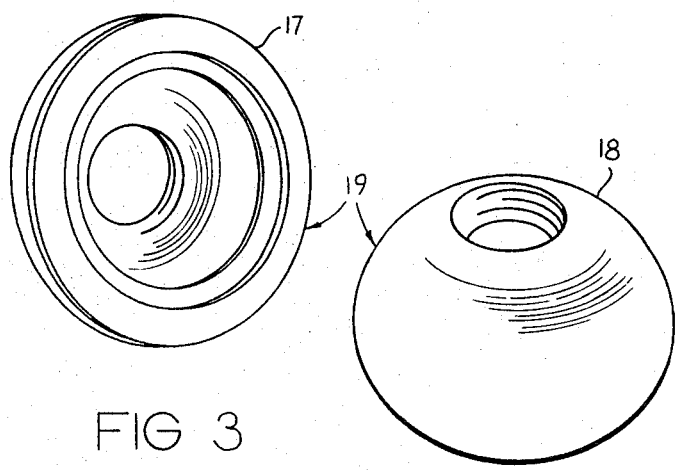
FIG. 3 is a perspective view of the two hemispherical sections of a porous gas bearing pad including internal bearing surfaces, and which are fabricated in accordance with the process of the present invention and are illustrated in the disassembled condition.
Figure 4:
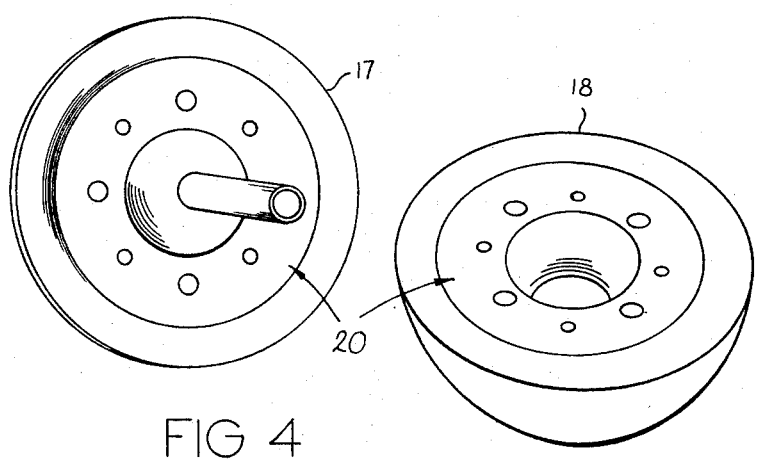
FIG. 4 is a perspective view of a gyro rotor associated with the porous gas bearing pad of FIG. 3 and illustrated in the disassembled condition.

FIG. 3 depicts the two halves 17, 18 of a spherical bearing pad 19 adapted for having the inner surface thereof finished as the bearing surface, and fabricated from an 85 percent density 316 stainless steel in accordance with one embodiment of the process of the present invention. That is, the two halves 17, 18 were fabricated from the same type of material as that on which tests were run to generate the pressure flow curve of FIG. 5. The fabrication process involved forming the two halves by known techniques, mechanically machining the bearing surfaces of the two halves, and following the latter operation by a chemical finish machining of such surfaces. Although not shown, it is to be understood that the two halves would subsequently be joined preferably by an electron beam welding operation to form a spherical unitary structure. FIG. 4 illustrates the two halves 17, 18 of the spherical bearing pad 19 of FIG. 3 associated with gyro rotor means 20 as viewed in the disassembled condition. It is to be understood from the foregoing that the gyro rotor means would be assembled in place in bearing relation in the finish machined pad halves 17 and 18 and then the pad halves would be joined to capture the rotor means therein to provide a gyro rotor/spherical bearing assembly.

Based on tests performed on the gyro rotor/spherical bearing assembly of FIG. 4 wherein a porous 316 stainless steel bearing has been substituted for the conventional orifice feed bearing, it has been verified that predicted case erection torques of essentially zero magnitude are realized with the porous bearing support. Further, although heretofore precision spherical grinding and lapping was required to fabricate bearings of low sphericity error, sphericity requirements of the porous bearings fabricated in accordance with the process of the present invention can be downgraded by a factor of 10:1. In addition, the fabrication process of the present invention permits simple production shop equipment to be employed to manufacture the porous metal bearings by means of this process.

Thus, in accordance with the present invention there has been provided a novel and improved process for fabricating porous metal bearings wherein the bearings after fabrication retain substantially the original porosity of the material from which the bearings are fabricated. Moreover, in accord with the process of the present invention porous metal bearings having surfaces possessing extremely close tolerances are capable of being fabricated thereby. Also, the process of the present invention permits porous bearings to be fabricated which embody the precision necessary to permit their employment in two degree-of-freedom gyros. Finally, the process for fabricating porous metal bearings in accordance with the present invention is characterized by its relatively low cost of operation, the ease with which it may be practiced, and its ability to be adapted for high production, uniformly reproducible manufacturing.

While only one embodiment of our invention has been specifically illustrated in the drawing of the instant application, it will be appreciated that modifications thereof may readily be made therein by those skilled in the art. For example, although the process in accord with the present invention has been described hereinabove in connection with the fabrication of porous bearings having a spherical bearing surface configuration, it is to be understood that bearings having other bearing surface geometries, such as cylindrical, may also be fabricated thereby. In addition, for those applications wherein it is desired to utilize two halves of a porous spherical pad rather than a bearing of unitary construction, the step of joining the two halves by electron beam welding may be omitted from the practice of the process of the present invention. Furthermore, the sphere could be constituted of a plurality of segments other than hemispheres, especially if the decreased porosity resulting from more weld area can be tolerated. Thus, it will be appreciated that many other modifications of our invention may readily be made by those skilled in the art, and we therefore intend by the appended claims to cover the above suggested modifications as well as all other modifications which fall within the true spirit and scope of our invention.

What we claim as new and desire to secure by Letters Patent of the United States is:

1. A process for fabricating a porous bearing comprising the steps of:
   a. rough forming a pair of bearing sections from blanks of porous material;
   b. joining together the pair of bearing sections to form an unfinished bearing of unitary construction;
   c. precision machining the bearing surfaces of the unfinished bearing to the appropriate dimensions; and
   d. thereafter chemically removing from the bearing surfaces of the machined bearing a uniform relatively small thickness of material thereby to reopen the pores closed or restricted as a result of the precision machining of the exterior surfaces and thus to provide a properly diminished, finished porous bearing.

2. A process for fabricating a porous bearing as set forth in claim 1, wherein the step of rough forming comprises rough forming two substantially hemispherical sections of a bearing from blanks of porous metal material.

3. A process for fabricating a porous bearing as set forth in claim 1, wherein the step of joining comprises electron beam welding the pair of bearing sections together to form an unfinished bearing of unitary construction with minimal reduction in porosity at the joint.

4. A process for fabricating a porous bearing as set forth in claim 1, wherein the step of precision machining comprises a final mechanical machining on a lathe of the bearing surfaces of the unfinished bearing.

5. A process for fabricating a porous bearing as set forth in claim 1, wherein the step of chemically machining comprises etching the exterior surfaces of the machined bearing.

6. A process for fabricating a porous metal bearing comprising the steps of:
   a. rough forming two halves of a bearing assembly from blanks of porous metal;
   b. electron beam welding the two halves together to form an unfinished bearing of unitary construction and with minimal reduction in the porosity of the metal;
   c. mechanically machining the bearing surfaces of the unfinished bearing to appropriate dimensions; and
   d. etching the bearing surfaces of the machined bearing with a photo-etchant to uniformly remove a small thickness of metal from the bearing surfaces thereby to reopen the pores therein closed or restricted as a result of the mechanical machining of the bearing surfaces and thus to provide a properly diminished, finished porous bearing.

7. A process for fabricating a porous metal bearing as set forth in claim 6, wherein the step of rough forming comprises rough forming each of the two halves into a substantially semi-spherical configuration.

8. A process for fabricating porous bearings comprising the steps of:
   a. rough forming a first substantially semi-spherical bearing member from a blank of metal having a porosity in the range of about 70 percent to 85 percent;
   b. mechanically machining the bearing surfaces of the bearing member; and
   c. etching the bearing surfaces of the bearing member with a photo-etchant to uniformly remove a small thickness of metal from the bearing surfaces of the bearing member thereby to reopen the pores therein closed or restricted as a result of the mechanical machining of the surfaces of the bearing member and thus to provide a properly dimensioned, substantially semispherical porous bearing.

9. A process for fabricating porous bearings as set forth in claim 8 comprising the further steps of:
   a. rough forming a second substantially semi-spherical bearing member from a blank of metal having a porosity in the range of about 70 percent to 85 percent;
   b. mechanically machining the bearing surfaces of the second bearing pad;
   c. etching the bearing surfaces of the second bearing member with a photo-etchant to uniformly remove a small thickness of metal from the surfaces of the second bearing member thereby to reopen the pores therein closed or restricted as a result of the mechanical machining of the surfaces of the second bearing member and thus to provide a second properly dimensioned, substantially semi-spherical porous bearing member; and
   d. electron beam welding the first and second bearing members together to form a unitary structure of substantially spherical configuration.

10. A process for fabricating porous bearing members comprising the steps of:
    a. rough forming a bearing member from a blank of metal of predetermined porosity and to have a defined bearing surface;
    b. mechanically machining the bearing surface of the member; and
    c. chemically machining the bearing surface to remove a uniform relatively small thickness of metal from the bearing surface to expose a finished bearing surface having the porosity of the blank metal.

11. A process for fabricating porous bearing members as set forth in claim 10, wherein the chemical machining step is effected with a photo-etchant.

12. A process for fabricating a porous bearing comprising the steps of:

a. rough forming a plurality of bearing members from blanks of metal of predetermined porosity and with surface portions conjointly defining a bearing surface when said members are joined in a predetermined assembled relation;
b. mechanically machining the bearing surface portions of both said members to predetermined dimensions;
c. etching the bearing surface portions of both said members to remove a relatively small thickness of metal from the bearing surface portions to provide a finished bearing surface having the porosity of the blank metal; and
d. electron beam welding said members together for joining them in said predetermined assembled relation with minimal reduction in the porosity of the resultant bearing.

* * * * *

PO-1050
(5/69)

UNITED STATES PATENT OFFICE
CERTIFICATE OF CORRECTION

Patent No. 3,763,534          Dated October 9, 1973

Inventor(s) Thomas F. Conroy & Carl G. Ringwall

It is certified that error appears in the above-identified patent and that said Letters Patent are hereby corrected as shown below:

Column 7, line 38,      "diminished" should be - dimensioned -

Column 8, line 10,      "diminished" should be - dimensioned -

Signed and sealed this 16th day of April 1974.

(SEAL)
Attest:

EDWARD M. FLETCHER, JR.          C. MARSHALL DANN
Attesting Officer                     Commissioner of Patents